United States Patent
Orozco Rodriguez et al.

(10) Patent No.: US 10,613,348 B2
(45) Date of Patent: Apr. 7, 2020

(54) DIRECT SURFACING OPTIMIZED LENS BLANK

(71) Applicant: Vision Ease, LP, Ramsey, MN (US)

(72) Inventors: José A Orozco Rodriguez, Saint Paul, MN (US); David Olund, Stanchfield, MN (US)

(73) Assignee: Vision Ease, LP, Ramsey, MN (US)

( * ) Notice: Subject to any disclaimer, the term of this patent is extended or adjusted under 35 U.S.C. 154(b) by 85 days.

(21) Appl. No.: 15/644,666

(22) Filed: Jul. 7, 2017

(65) Prior Publication Data
US 2018/0011343 A1  Jan. 11, 2018

Related U.S. Application Data

(60) Provisional application No. 62/360,250, filed on Jul. 8, 2016.

(51) Int. Cl.
*B29D 11/00* (2006.01)
*G02C 7/06* (2006.01)
*B29K 69/00* (2006.01)

(52) U.S. Cl.
CPC .......... *G02C 7/06* (2013.01); *B29D 11/00009* (2013.01); *B29D 11/0048* (2013.01); *B29D 11/00413* (2013.01); *B29K 2069/00* (2013.01); *G02C 7/061* (2013.01); *G02C 2202/08* (2013.01)

(58) Field of Classification Search
CPC .......... G02C 7/02; G02C 7/027; G02C 7/028; G02C 2202/08; G02C 7/06; G02C 7/061; B29D 11/00009; B29D 11/00413; B29D 11/0048; B29D 11/00; B29K 2069/00
See application file for complete search history.

(56) References Cited

U.S. PATENT DOCUMENTS

| 4,364,878 A | * | 12/1982 | Laliberte | ............... B29C 45/561 264/2.2 |
| 7,004,583 B2 | | 2/2006 | Miniutti et al. | |
| 9,176,329 B2 | | 11/2015 | Kelch | |

(Continued)

FOREIGN PATENT DOCUMENTS

WO    WO 2015/147777 A1    10/2015

OTHER PUBLICATIONS

WIPO, U.S. International Search Authority, International Search Report and Written Opinion dated Nov. 9, 2017 in International Patent Application No. PCT/US2017/041254, 11 pages.

(Continued)

*Primary Examiner* — William R Alexander
*Assistant Examiner* — Balram T Parbadia
(74) *Attorney, Agent, or Firm* — Inskeep IP Group, Inc.

(57) ABSTRACT

A semi-finished ophthalmic lens for formation of a plurality of different finished ophthalmic lenses requiring reduced amounts of lens material to be removed for formation of the finished ophthalmic lenses and reduced rates of departure of a surfacing tool and methods of making the same. Lens material is reduced by providing first and second surfaces that have different optical powers, the second optical surface having a second curve that approximates second optical surfaces of a plurality of finished ophthalmic lenses at coordinates at which lenses of the plurality of finished ophthalmic lenses have maximum thicknesses.

15 Claims, 7 Drawing Sheets

(56) References Cited

U.S. PATENT DOCUMENTS

| | | | | |
|---|---|---|---|---|
| 2010/0245753 A1* | 9/2010 | Wolfgang | ............... | G02C 7/024 |
| | | | | 351/54 |
| 2010/0283965 A1 | 11/2010 | Dubois et al. | | |
| 2013/0247619 A1* | 9/2013 | Tanaka | ................ | C03B 23/0026 |
| | | | | 65/102 |
| 2013/0258273 A1* | 10/2013 | Kelch | .................... | G02C 7/022 |
| | | | | 351/159.01 |
| 2015/0309333 A1* | 10/2015 | Uchiyama | ............... | G02C 7/027 |
| | | | | 351/159.76 |
| 2015/0316787 A1* | 11/2015 | Tanaka | ................... | G02C 7/068 |
| | | | | 351/159.75 |
| 2016/0192836 A1 | 7/2016 | Blum et al. | | |
| 2017/0090214 A1* | 3/2017 | Honma | .................... | G02C 7/06 |
| 2017/0235157 A1* | 8/2017 | Padiou | .................. | B33Y 80/00 |
| | | | | 351/159.74 |

OTHER PUBLICATIONS

Wikipedia, "Corrective Lens", May 26, 2016, retrieved from the internet URL: https:en.wikipedia.org/w/index.php?title=Corrective_lens&oldid=7222212993, pp. 1, 3, 4, 9.

Camber Lens, "Front Surface Innovation", May 23, 2016, retrieved from the internet URL: https://web.archive.org/web/20160523170801/http://camberlens.com/front_surface_innovation.aspx, p. 1.

* cited by examiner

Fig. 5

| Lens | CT (mm) | Top ET (mm) 90 degrees | Bottom ET (mm) 270 degrees | Volume (ml) |
|---|---|---|---|---|
| Conventional Semi-Finished Lens Blank (46) | 8.5 | 10.0 | 10.0 | 40 |
| Optimized Semi-Finished Lens Blank A (56) | 6.0 | 6.0 | 4.0 | 24 |
| Optimized Semi-Finished Lens Blank B (54) | 4.2 | 6.0 | 4.0 | 18 |
| Type I Finished Lens (48) | 2.6 | 5.5 | 3.5 | 13 |
| Type II Finished Lens (50) | 3.8 | 3.0 | 1.3 | 16 |
| Type III Finished Lens (52) | 5.6 | 4.0 | 1.3 | 22 |

Fig. 6

| Lens | Volume of Material Removed from Lens Blank (ml) | | | Frequency |
|---|---|---|---|---|
| | Conventional (46) | Optimized A (56) | Optimized B (54) | |
| Type I (48) | 27 | 11 | 5 | 25% |
| Type II (50) | 24 | 8 | 2 | 55% |
| Type III (52) | 18 | 2 | - | 20% |

Fig. 7

| Step | Time (min) |
|---|---|
| Taping | 0:20 |
| Blocking | 1:30 |
| Generator: roughing wheel | 0:30 |
| Generator: diamond tool | 1:00 to 2:30 |
| Polishing | 2:30 to 4:00 |
| Engraving | 0:30 |
| De-blocking | 0:30 |

| Add power | Quantity | Conventional lens blank | | Optimized lens blank | |
|---|---|---|---|---|---|
| | | Generator time per lens (sec.) | Quantity times generator time (sec.) | Generator time per lens (sec.) | Quantity times generator time (sec.) |
| 0.50 | 0 | 70.0 | 0 | 80.5 | 0 |
| 0.75 | 4 | 71.5 | 286 | 79.0 | 316 |
| 1.00 | 10 | 73.0 | 730 | 77.5 | 775 |
| 1.25 | 30 | 74.5 | 2235 | 76.0 | 2280 |
| 1.50 | 60 | 76.0 | 4560 | 74.5 | 4470 |
| 1.75 | 80 | 77.5 | 6200 | 73.0 | 5840 |
| 2.00 | 130 | 79.0 | 10270 | 71.5 | 9295 |
| 2.25 | 220 | 80.5 | 17710 | 70.0 | 15400 |
| 2.50 | 360 | 82.0 | 29520 | 71.5 | 25740 |
| 2.75 | 80 | 83.5 | 6680 | 73.0 | 5840 |
| 3.00 | 20 | 85.0 | 1700 | 74.5 | 1490 |
| 3.25 | 4 | 86.5 | 346 | 76.0 | 304 |
| 3.50 | 2 | 88.0 | 176 | 77.5 | 155 |
| Total: | 1000 | Total time (hours): | 22.34 | Total time (hours): | 19.97 |

DIRECT SURFACING OPTIMIZED LENS BLANK

RELATED APPLICATIONS

This application claims benefit of and priority to U.S. Provisional Application Ser. No. 62/360,250 filed Jul. 8, 2016, entitled Direct Surfacing Optimized Lens Blank, which is hereby incorporated herein by reference in its entirety.

FIELD OF THE INVENTION

The invention relates to ophthalmic lenses and methods of manufacturing the same and, more particularly, to semi-finished ophthalmic lens blanks employing shapes optimized for direct surfacing and methods of manufacturing the same.

BACKGROUND OF THE INVENTION

Finished ophthalmic lenses, such as progressive addition lenses or graduated prescription lenses, have traditionally been manufactured through a process starting with a semi-finished lens blank that is molded or cast between glass or metal molds. The semi-finished lenses are typically formed of one of a variety of synthetic polymeric materials and are commonly provided with a progressive design, a base curve, and an add power portion of the lens molded on a first surface, e.g. a front surface, of the lens. The second, back surface of the lens may be plano or curved and requires additional surfacing in order to provide the lens with the desired optical power and/or thickness. An optical laboratory grinds the desired prescription into the back surface of the lens blank using a generator and then polishes the back surface to complete the grinding process.

Advances in digital or direct surfacing techniques and equipment now allow for what has been referred to as free-form manufacturing of lenses. In free-form manufacturing, a generator is employed to form or grind the prescription, e.g. the add power, the base curve, and/or the corridor position, into a back surface of a lens blank having a spherical front lens blank so as to form the finished lens. The generator may use a single point cutter to produce the desired lens surface or surfaces. The cutting can only be performed on the back of a semi-finished lens. Most free-form generators will have a second or even a third cutter that produces a very smooth surface, e.g. by employing a diamond tip cutter, after the initial rough or bulk cutter removes the bulk of the undesired lens material. The lens is then finished on a specialized lens polisher that uses conformable tools or soft laps that buff the ground surface of the lens without destroying the surface details of the lens surface, i.e. without destroying or modifying the add power, base curve, and/or corridor position of the finished lens. An exemplary cycle time for the formation of a free-form manufactured, finished lens is provided in FIG. 7.

Due, in part, to the various advantages offered by lenses formed using free-form manufacturing techniques, for example the ease of customization, optical labs employing free-form manufacturing techniques are experiencing significant commercial pressure to increase finished lens throughput. The free-form lens manufacturing strategy also allows a lower inventory carry for optical laboratories because the cylinder and add power are generated into the back of the lens requiring only single vision blanks in one diopter spread. However, due to the highly sophisticated nature, significant cost, and limited production of the digital or direct surfacing machinery employed in free-form manufacturing, optical labs are often limited in their ability to simply increase throughput by employing additional direct surfacing machinery. Hence, there is a need in the field to increase the throughput of the existing direct surfacing machinery employed in the free-form lens manufacturing process.

OBJECTS AND SUMMARY OF THE INVENTION

The present invention provides solutions for increasing the throughput of existing direct surfacing machinery employed in the free-form lens manufacturing process. These objectives are, in part, achieved by providing a first optical surface having a first curve; and a second optical surface having a second curve that approximates second optical surfaces of a plurality of finished ophthalmic lenses at coordinates at which lenses of the plurality of finished ophthalmic lenses have maximum thicknesses; the lenses of the plurality of finished ophthalmic lenses comprising first optical surfaces having the first curve; the lenses of the plurality of finished ophthalmic lenses comprising optical powers that are different from one another. Wherein the first optical surface comprises a variable radius curve and/or a free form curve. Wherein the first optical surface comprises a single base curve. Wherein the first optical surface forms a front surface of the semi-finished ophthalmic lens. Wherein the coordinates at which lenses of the plurality of finished ophthalmic lenses have maximum thicknesses are coordinates near edges of the lenses of the plurality of finished ophthalmic lenses. Wherein the coordinates at which lenses of the plurality of finished ophthalmic lenses have maximum thicknesses are coordinates near centers of the lenses of the plurality of finished ophthalmic lenses. In certain embodiments of the present invention, these objectives are further achieved, in part, by providing a polycarbonate or thiourethane semi-finished lens blank and/or by providing an edge defining an edge shape that approximates edge shapes of lenses of the plurality of finished ophthalmic lenses at coordinates at which the lenses of the plurality of finished ophthalmic lenses have maximum dimensions.

These objectives are further achieved, in part, by providing a semi-finished ophthalmic lens comprising: a front optical surface having a first curve; a back optical surface having a second curve; and an edge defining an edge shape that approximates edge shapes of a plurality of finished ophthalmic lenses at coordinates at which the lenses of the plurality of finished ophthalmic lenses have maximum dimensions; the lenses of the plurality of finished ophthalmic lenses comprising different edge shapes. Wherein the first optical surface comprises a front surface of the semi-finished ophthalmic lens. Wherein the edge shape is oblong. Wherein the edge shape is non-symmetric or symmetric. Wherein the second curve of the back optical surface approximates second optical surfaces of the plurality of finished ophthalmic lenses at coordinates at which lenses of the plurality of finished ophthalmic lenses have maximum thicknesses, the lenses of the plurality of finished ophthalmic lenses comprising different optical powers.

These objectives are further achieved, in part, by providing a method for forming a semi-finished ophthalmic lens comprising: obtaining a first lens mold having a first curved surface for forming a first optical surface; obtaining a second lens mold having a second curved surface for forming a second optical surface, the second curved surface approximating second optical surfaces of a plurality of finished ophthalmic lenses at coordinates at which lenses of the plurality of finished ophthalmic lenses have maximum thicknesses; introducing a fluid bulk lens material between the first curved surface of the first lens mold and the second curved surface of the second lens mold; solidifying the fluid bulk lens material; and removing a formed semi-finished ophthalmic lens from between the first and second lens molds. Wherein obtaining a first lens mold and obtaining a second lens mold comprises obtaining first and second lens molds that define an edge shape that approximates edge shapes of lenses of the plurality of finished ophthalmic lenses at coordinates at which the lenses of the plurality of finished ophthalmic lenses have maximum dimensions. Wherein obtaining the first lens mold having the first curved surface for forming the first optical surface comprises obtaining a first lens mold having a base curve. Wherein obtaining the first lens mold having the first curved surface for forming the first optical surface comprises obtaining a lens mold having a curved surface for forming a front optical surface of the semi-finished ophthalmic lens. Wherein the coordinates at which lenses of the plurality of finished ophthalmic lenses have maximum thicknesses are coordinates near centers and near edges of the lenses of the plurality of finished ophthalmic lenses. Wherein introducing the fluid bulk lens material between the first curved surface of the first lens mold and the second curved surface of the second lens mold comprises introducing a polycarbonate.

BRIEF DESCRIPTION OF THE DRAWINGS

These and other aspects, features and advantages of which embodiments of the invention are capable of will be apparent and elucidated from the following description of embodiments of the present invention, reference being made to the accompanying drawings, in which

FIG. 5 is a table showing characteristics of a conventional semi-finished lens, various exemplary types of finished lenses, and various optimized semi-finished lenses according to embodiments of the present invention.

FIG. 6 is a table showing the frequency of production of exemplary types of finished lenses and the volume of material required to be removed from a conventional semi-finished lens blank and various optimized semi-finished lens blanks according to embodiments of the present invention in order to form finished lenses.

FIG. 7 is a table showing exemplary steps and the times for performing each step for the formation of a finished lens from a conventional semi-finished lens blank.

DESCRIPTION OF EMBODIMENTS

Figure 1:
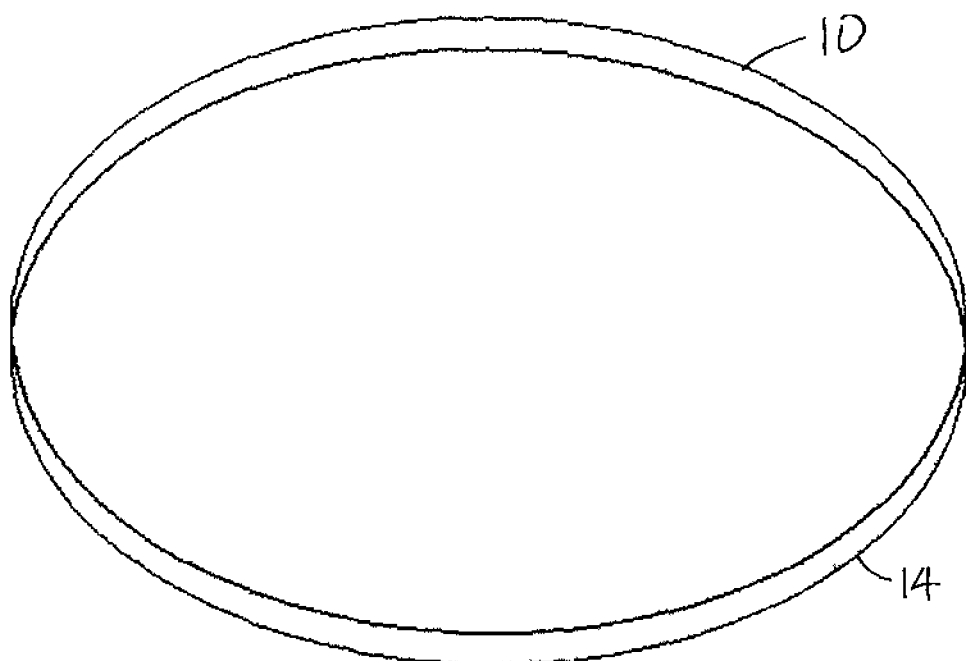
FIG. 1 is a perspective view of a finished ophthalmic lens.

Specific embodiments of the invention will now be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the embodiments illustrated in the accompanying drawings is not intended to be limiting of the invention. In the drawings, like numbers refer to like elements.

Broadly speaking, the present invention provides increased throughput for existing direct surfacing machinery employed in the free-form lens manufacturing process. This objective is achieved, in part, by providing semi-finished ophthalmic lenses or lens blanks and methods of designing semi-finished ophthalmic lenses or lens blanks that are optimized for use in the direct surfacing machinery employed in the free-form lens manufacturing process. More particularly, the semi-finished lens blanks and semi-finished lens blank designs of the present invention optimize the exact shape of the semi-finished ophthalmic lenses or lens blanks and, hence, the amount of bulk lens material employed in the lens blank so as to reduce or minimize the amount of bulk lens material required to be ground from the semi-finished ophthalmic lenses or lens blanks to form the desired finished lens. This, in turn, advantageously (1) reduces the amount of tool deflection on the initial roughing pass of the generator; (2) minimizes the back-and-forth movement, i.e. rate of departure, of the generator diamond tip so as to produce a better ground finish and to decrease the polishing time; and (3) minimizes the amount of material that is needed to be removed in order to edge the finished lens.

The present invention is directed, in part, to decreasing the typical cycle time for the formation of free-form manufactured, finished ophthalmic lenses. An example of a typical manufacturing cycle time employing a conventional semi-finished lens blank is shown in FIG. 7. More particularly, the present invention is, in part, directed to decreasing the time requirements for completing steps 3, 4, and 5 shown in FIG. 7. The present invention reduces tool deflection and chip load in step 3 which results in an improvement in step 4 along with an optimized toolpath to minimize surface deviation prior to polishing. The present invention also provides overall optical improvement in the finished lenses due to reduced polishing.

In certain embodiments, the optimized semi-finished lens blanks of the present invention enable a semi-finished lens blank manufacturer to produce a limited number of different designs of optimized semi-finished lens blanks. Each design is optimized for use in free-form manufacturing of finished lenses of a specific range of prescriptions and designs.

In certain embodiments of the present invention, instead of a spherical front and spherical back surface as employed in a conventional semi-finished lens blank, a free form front surface and a free form back surface is employed in the inventive semi-finished lens blank in order to benefit throughput by decreasing the volume of bulk lens material to be cut and polished from the semi-finished lens blank during formation of a finished lens. This is achieved by reducing the rate of departure on the cut and polished side by optimizing the optical surface shape or curvature at the time of designing and forming of the inventive semi-finished lens blank, i.e. optimizing the optical surface shape or curvature prior to loading the inventive semi-finished lens blank into the surfacing generator.

For the sake of clarity, as used herein, the terms optical surface and lens surface refer to a surface through which a user of an ophthalmic lens views an object. For example, a back optical surface or back surface is a lens surface positioned closest to the user's eye when the user is viewing an object through the lens. A front optical surface or front surface is a surface that is farthest from the user's eye when the user views an object through the lens.

The terms finished ophthalmic lens, finished lens, and uncut finished lens refer to a lens having both a front optical surface and a back optical surface ground, surfaced, or otherwise prepared to provide the desired power or powers to the lens, but that has a lens edge that is not yet edged to the shape of the lens frame in which the finished ophthalmic lens will be employed or mounted. An example of a finished ophthalmic lens or finished lens 10 having an edge 14 is shown in FIG. 1.

Figure 2:
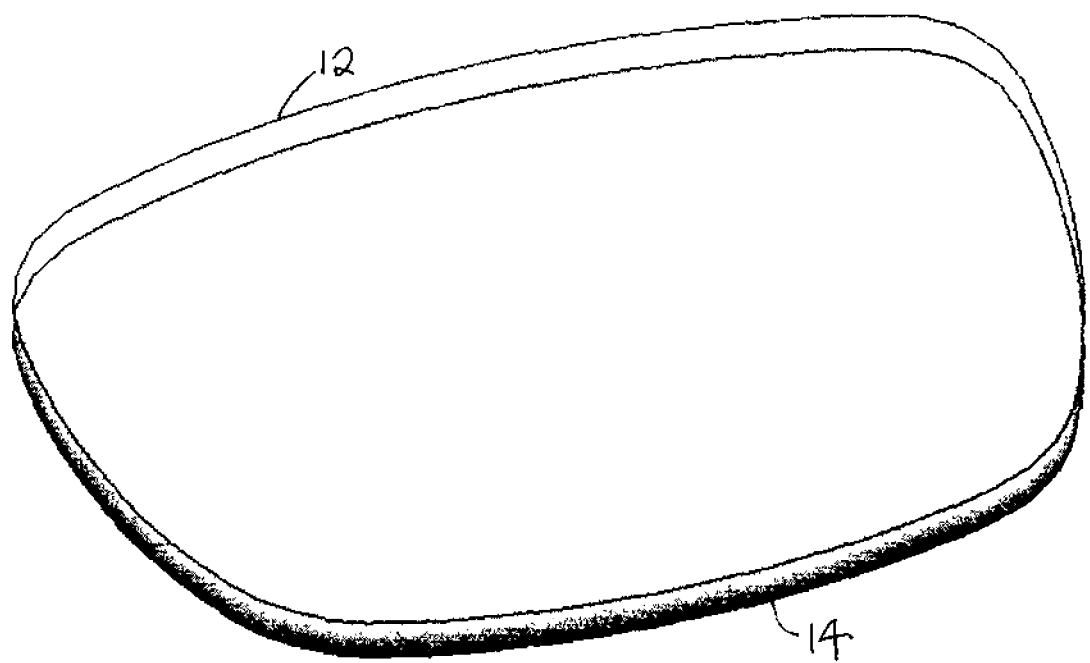
FIG. 2 is a perspective view of a finished, edged ophthalmic lens.

The terms finished edged ophthalmic lens, finished edged lens, and cut finished lens refer to a lens having a front optical surface and a back optical surface ground or surfaced to provide the desired power or powers to the lens and having a lens edge that has been edged to the shape of the lens frame in which the finished ophthalmic lens will be employed or mounted. An example of a finished edged ophthalmic lens 12 having an edge 14 is shown in FIG. 2.

The terms semi-finished ophthalmic lens, semi-finished ophthalmic lens blank, semi-finished lens blank, and uncut semi-finished lens refer to a lens having only one optical surface having a desired final curvature or surface shape. In order to produce a finished ophthalmic lens from a semi-finished lens, a second optical surface if the semi-finished lens must be surfaced, ground, or otherwise formed to provide the desired power or powers to the finished lens.

The terms edge and lens edge mean a perimeter, periphery, or boundary of an optical surface of a lens. The term edge shape refers to the overall shape or outline of the lens edge when viewed along an optical axis of the lens, i.e. when the lens is viewed in plan view.

Although a finished lens formed from the optimized semi-finished lens blanks of the present invention can be of any lens type, for the sake of clarity, the following discussion is directed to semi-finished lens blanks intended for use in forming finished progressive-addition lenses. Finished progressive-addition lenses are commonly formed in free-form, direct surfacing optical labs and involve the most complex optical surface geometries. However, one having ordinary skill in the art will recognize that the present invention is also applicable to the formation of alternative types of finished lenses and finished edged lenses.

In the following disclosure, for the sake of clarity, the designs of the front optical surface, the back optical surface, and the edge of semi-finished lens blanks according to the present invention are discussed separately. However, it will be appreciated that integration of each of the inventive optical surface and edge designs into a single semi-finished lens blank is contemplated and can advantageously lead to greater efficiencies in manufacturing.

In the following description, for the sake of clarity only and not by way of limitation, only the back optical surface of the semi-finished lens blank is described as being direct surfaced. In the following description, the front optical surface is formed during molding or casting of the semi-finished lens blank.

Front Optical Surface

Generally speaking, a front surface of a semi-finished lens blank of the present invention can be any free-form optical surface design, e.g. can be a superposition of several more elementary free-form optical surfaces. However, to understand the impact of the geometry of the front optical surface on the processing of the back optical surface, it may be helpful to distinguish between three different groups of optical surface types: spherical surfaces, aspheric surfaces, and progressive surfaces (free-form).

In certain embodiments, the front optical surface is a progressive surface type or design that varies gradually in optical power from distant to near zones. If the front optical surface cannot be progressive, it may be advantageous to employ an aspheric front surface. Consider, for example, two finished lenses, lens A and lens B, both with the exact same prescription or optical power, and both with the same edge shape. If lens A has a spherical front surface and lens B has an aspheric front surface, then the front optical surface of lens B is flatter than the front optical surface of lens A. This implies that the back optical surface of lens A is steeper than the back optical surface of lens B. Despite having the same edge shape, e.g. a 75 mm diameter circular shape, the total area of the back optical surface of lens A is greater than the total area of the back optical surface of lens B. Hence, it can be reasonably expected that it will take more time on average to surface or grind finished lenses with a given prescription when the front optical surface is spherical.

If the front optical surface is aspheric but has no progression, then all the progression of a finished progressive lens must be designed or provided on the back optical surface of the lens. This translates into increased back and forth movement and grinding of the diamond tip of the generator as the lens turns about its axis which, in turn, slows throughput. On the other hand, if the front surface has a progression, then the back surface requires less add power. Hence, the back and forth movement of the generator, also referred to and measured as rate of departure of bulk lens material, is significantly reduced and throughput is increased.

To understand the effect of rate of departure, consider a 2.50 D add progression surfaced on the back of a lens. The generator diamond tool must cut deeper near the bottom edge of the lens where the add power is 2.50 D, whereas it does not have to cut as deep near the top edge of the lens where there is no add power. Keeping in mind that the lens is turning at thousands of revolutions per minute so that the diamond tool must change depth thousands of times every minute. The higher the add power, the deeper the diamond tool must travel back and forth, and the longer it takes to complete a turn. Thus, when it takes, for example, 82 seconds to generate a 2.50 add progression on the back of a conventional lens blank, a 1.00 add progression may only take 73 seconds to generate on the back of the same lens blank.

In certain embodiments of the present invention, the front surface is designed with a certain add progression in order to relax or relieve the generator from having to cut the whole add progression on the back. Hence, in order to make a 2.50 add power lens using the inventive optimized semi-finished lens blank, the generator may only have to surface, for example, a 0.75 add progression on the back of the optimized lens blank. Therefore, a 2.50 add lens would be generated 9 or more seconds faster than when employing a conventional semi-finished lens blank.

Figures 10, 11:
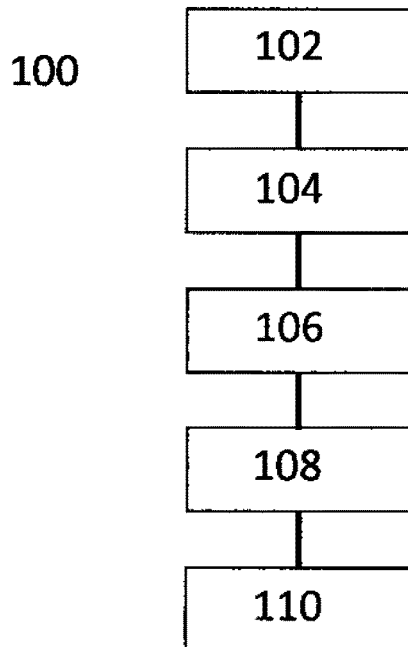
FIG. 10 shows a method for forming a semi-finished lens blank according to one embodiment of the present invention.
FIG. 11 is a table showing exemplary times for the formation of a finished lens from a conventional semi-finished lens blank.

To conceptualize how using an optimized lens blank according to the present invention would impact throughput in a surfacing lab, assume that the time spent by the generator diamond tool increases 1.5 seconds with every 0.25 diopter increase in add power. Assume further that an inventive semi-finished lens blank has been optimized so that a 2.25 add power lens is generated as fast as a 0.50 add power lens is generated on a conventional semi-finished lens blank. FIG. 11 shows a table of hypothetical, but realistic distribution of add powers that a surfacing lab may have to generate on a given day. The table also provides the hypothetical time spent per lens by the generator diamond tool for every add power both using a conventional semi-finished lens blank and an optimized semi-finished lens blank.

FIG. 11 shows that it would take 22.34 hours to generate 1,000 lenses using a conventional semi-finished lens blank, compared to 19.97 hours that it would take using the inventive optimized semi-finished lens blank. Comparing throughput, the lab can generate 1,118 lenses by employing the inventive optimized semi-finished lens blank in the same time it takes to generate 1,000 lenses with the conventional semi-finished lens blank, accounting for an 11.8% throughput increase.

FIG. 11 illustrates the underlying main principle in optimizing the front surface of the inventive semi-finished lens blank. In practice, the front surface is optimized with the input of the surface definition files (SDF), which describe the x, y, z coordinates of the surfaces that are to be generated on the back of the semi-finished lens blanks in order to produce finished lenses. In this way, in addition to add power progression, all of the other parameters such as cylinder, cylinder axis, main reference points, etc. are implicitly input into the optimization algorithm. The algorithm then outputs the free-form front surface that minimizes the rate of departure of the sum of all of the back surfaces generated in the lab, equivalently, maximizing the surfacing lab throughput.

Back Optical Surface

Figure 3:
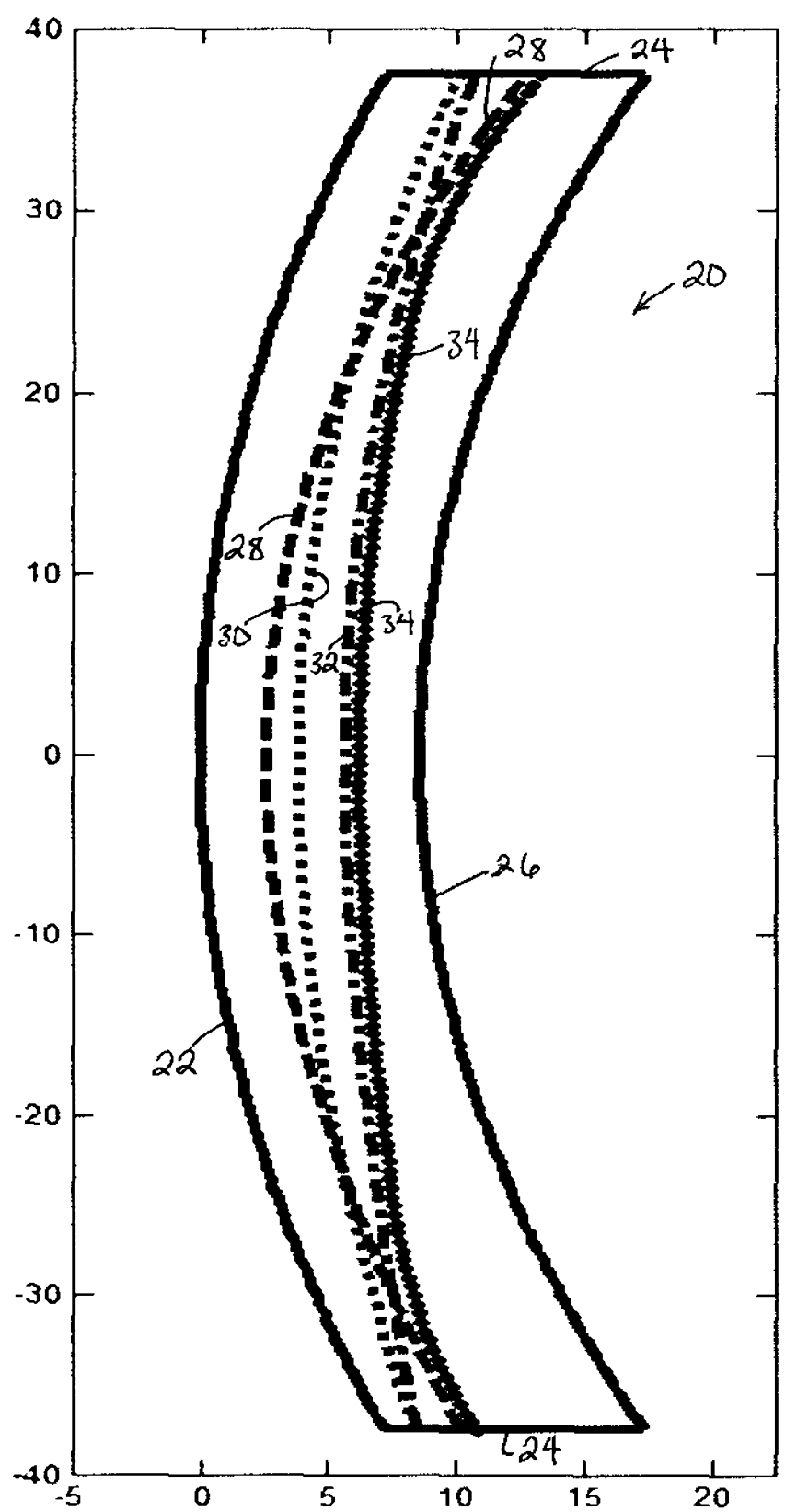
FIG. 3 is a side cross-sectional view of a lens shown with exemplary back optical surfaces of finished ophthalmic lenses, a back optical surface of a conventional semi-finished lens, and an optimized back optical surface of a semi-finished lens according to one embodiment of the present invention.

In certain embodiments, once the front optical surface of the optimized semi-finished lens blank has been determined, the next step is to calculate all of the representative back surfaces desired to be formed or cut from the back optical surface of the specific semi-finished lens blank. FIG. 3 shows a semi-finished lens 20 having a front optical surface 22 and edge 24. For the sake of comparison and clarity, the semi-finished lens 20 is shown with various different back optical surfaces. Back optical surface 26 is representative of a back optical surface of a conventional semi-finished lens blank. Back optical surfaces 28, 30, and 32 are representative of different back optical surfaces of finished lenses desired to be formed from the semi-finished lens 20. Back optical surface 34 is an inventive back optical surface of a semi-finished lens 20 according to one embodiment of the present invention. For the sake of clarity, only three example finished lens back surfaces are shown in FIG. 3. However, it is contemplated that hundreds or thousands of back surface designs may be considered in the design of the inventive semi-finished lens blank.

In certain embodiments, the back optical surface of the inventive semi-finished lens blank is determined by forming a best-fit or a surface that is approximately representative of the maximum thickness of the back surfaces of finished lenses intended to be produced from the semi-finished lens, for example back optical surfaces 28, 30, and 32 shown in FIG. 3. The terms approximate, approximates, and approximately representative of are intended to mean coming or being as nearly the same as practically possible in the context of the field of ophthalmic lens production. The maximum thicknesses are determined as the maximum distance from the front optical surface of a finished lens to the back optical surface of a finished lens for all surface designs considered. For example, the maximum thickness is given by the back optical surface 28 at the top and the bottom portions of the semi-finished lens blank 20 and by the back optical surface 32 at a center or central portion of the semi-finished lens blank 20, as shown in FIG. 3.

The inventive back optical surface 34 forms a smooth surface, or line in the cross-sectional view of the semi-finished lens blank 20 shown in FIG. 3, that provides a desired maximum thickness of the inventive semi-finished lens blank 20 that minimizes the amount of bulk lens material required to be removed from the semi-finished lens blank 20 in order to form a desired range of finished ophthalmic lenses having back surfaces 28, 30, and 32. In other words, the inventive back optical surface 34 is as close as possible to coordinates at which finished lenses desired to be formed from the semi-finished lens 20 have maximum thicknesses.

In certain embodiments of the present invention, the total number of finished lens surface designs that are considered in the design process for a given semi-finished lens blank surface according to the present invention is determined as follows. The following example assumes that a particular semi-finished lens blank front optical surface will be employed and that only the back optical surface of the semi-finished lens blank will be subject to direct surfacing.

First, for a given front optical surface base curve, the extreme back surface design cases are considered, as all other back optical surface design cases will fall in between these extremes. For example, assume a semi-finished lens blank will be used to form finished lenses in the range of minus 2 to plus 2 diopter. Next, calculate the minus 2 and plus 2 diopter lenses to estimate the largest edge thicknesses of the finished lenses, ET, and largest center thickness of the finished lenses, CT. All other prescriptions will provide intermediate thicknesses (2 cases). Calculate the lowest and highest add powers, for example plus 1 and plus 3.50 (2 cases). Calculate the shortest and longest corridors, for example 10 and 20 mm (2 cases). Calculate for minimum (0 mm) inset and maximum (4 mm) inset (2 cases). Calculate for maximum decentration in every direction: left, right, up, and down (4 cases). For cylinder axis, calculate at 45, 90, 135, and 180 degrees (4 cases). Repeat the above calculations for every finished lens surface design considered, for example, repeat for all-purpose progressing addition lenses, PAL, designs and far-enhanced PAL design (2 cases).

Multiplying the number of cases at each step described above, e.g. 2×2×2×2×4×4×2=512, results in the number of back optical surface designs of finished lenses to be calculated and superimposed to determine the optimized back optical surface design of the inventive semi-finished lens blank. It will be recognized that this is an initial estimate and that, depending on the exact range and type of finished lenses to be formed from the inventive semi-finished lens blank, certain of the above described parameters may not be relevant and/or other relevant parameters may need to be considered. It will be noted that the above described method works regardless of the geometry of the opposite, front optical lens surface of the semi-finished lens blank. For example, even if it is not possible to employ a progressive front surface on the inventive semi-finished lens blank, the general method for determining the back optical surface remains the same.

If, for example, the front optical surface is one that has been extensively used in optical labs, for example front spherical, then there is no need to calculate all the desired back optical surfaces ab initio. As described above, it may be possible to access the myriad of data files with x, y, and z coordinates of back optical surfaces that have been cut in a large optical lab over a period of time, for example one year. In addition to providing the x, y, and z data of the surfaces of finished lenses, this strategy provides the frequency with which each surface of a finished lens is produced. This allows targeting of the semi-finished lens blank optical surface optimization on a subset of surfaces that occur depending on frequency of production. For example, if the most frequent surfaces are like of the back optical surface 30 shown in FIG. 3 and/or the back optical surface 50 shown in FIG. 4, then it may be advantageous to design a semi-finished lens blank with an optimized back optical surface such as that of the inventive back optical surface 34 shown in FIG. 3 or with an optimized back optical surface such as that of the inventive back optical surface 54 shown in FIG. 4.

Figure 4:
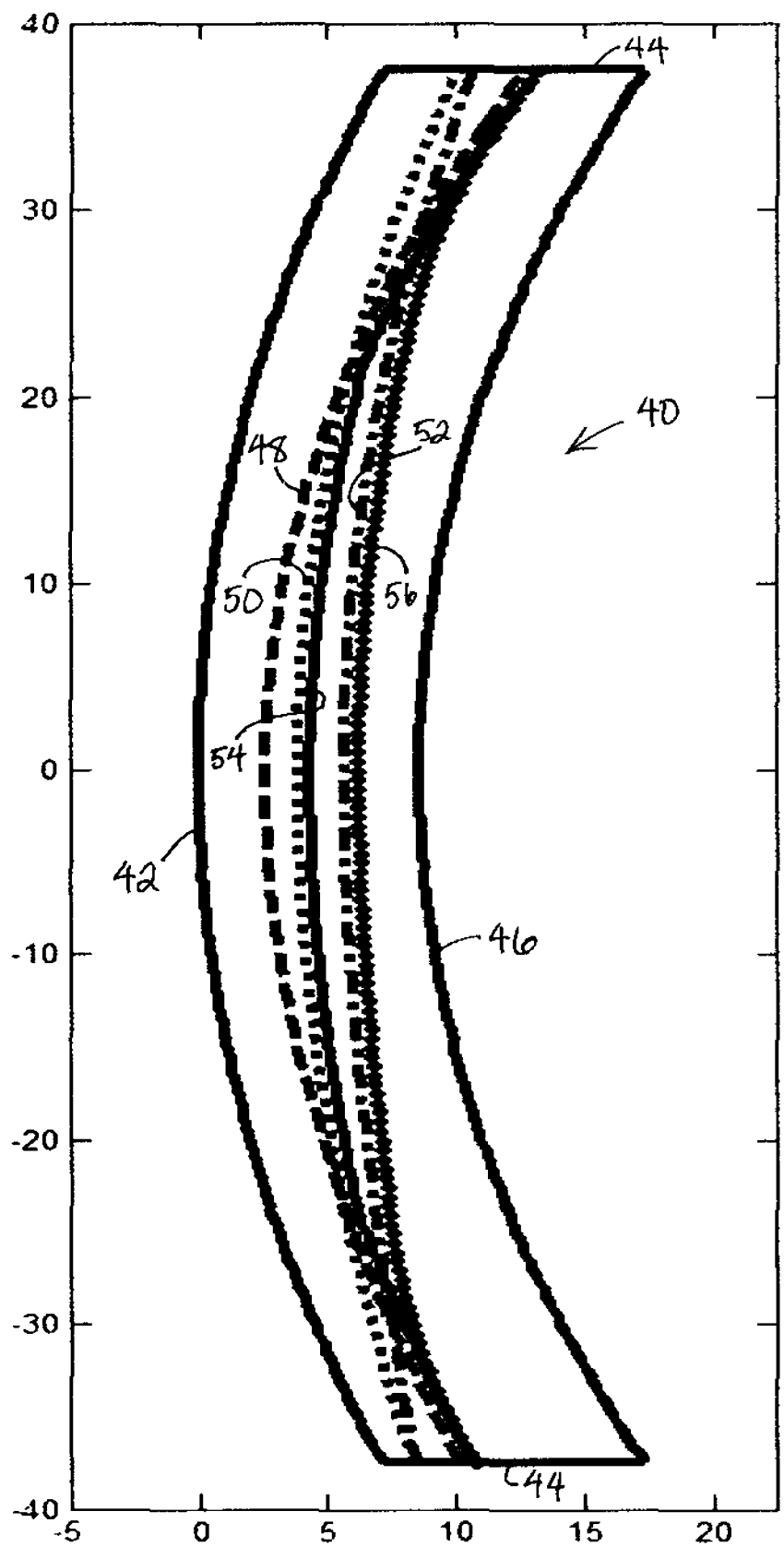
FIG. 4 is a side cross-sectional view of a lens shown with exemplary back optical surfaces of finished ophthalmic lenses, a back optical surface of a conventional semi-finished lens, and various optimized back optical surfaces of a semi-finished lens according to embodiments of the present invention.

To demonstrate the advantages of the semi-finished lens blank designs and semi-finished lenses of the present invention, it is necessary to consider the differences in the amount of bulk lens material that must be removed depending upon the semi-finished lens employed. With reference to FIGS. 4-6, assume that Type I finished lenses are produced 25% of the time at the optical lab, Type II finished lenses are produced 55% of the time, and Type III finished lenses are produced 20% of the time.

FIG. 4 shows a cross-sectional view of semi-finished lens 40 having a front optical surface 42 and edge 44. For the sake of comparison and clarity, the semi-finished lens 40 is shown with various different back optical surfaces. Back optical surface 46 is representative of a back optical surface of a standard or conventional semi-finished lens blank. Back optical surface 48 is representative of a back optical surface of a Type I finished lens. Back optical surface 50 is representative of a back optical surface of a Type II finished lens. Back optical surface 52 is representative of a back optical surface of a Type III finished lens. Back optical surface 54 is representative of an inventive back optical surface of an Optimized Semi-Finished Lens Blank A, and back optical surface 56 is representative of an inventive back optical surface of an Optimized Semi-Finished Lens Blank B.

FIG. 5 shows the center thickness, CT; the top edge thickness, Top ET; the bottom edge thickness, Bottom ET; and the total volumes of the bulk lens material from which each lens is formed.

FIG. 6 shows the volume of bulk lens material that needs to be removed from each of the Conventional Semi-Finished Lens Blank, the Optimized Semi-Finished Lens Blank A, and the Optimized Semi-Finished Lens Blank B to produce each of the three types of finished lenses: I, II, and III. Hence, the following example finished lens production scenarios can be calculated.

Conventional Semi-Finished Lens Blank only: 27×25% (Type I)+24×55% (Type I)+18×20% (Type III)=23.55 ml Optimized Semi-Finished Lens Blank A only: 11×25%+8×55%+2×20%=7.55 ml Optimized Semi-Finished Lens Blank B and Conventional Semi-Finished Lens Blank as needed: 5×25%+2×55%+18×20%=5.95 ml Optimized Semi-Finished Lens Blank B and Optimized Semi-Finished Lens Blank A as needed: 5×25%+2×55%+2×20%=2.75 ml In view of the above numerical examples, it is clear that employing the combination of Optimized Semi-Finished Lens Blank B, optimized for production of Type I and II Finished Lenses with the Conventional Semi-Finished Lens Blank for production of Type III Finished Lenses requires less material to be removed than the option of always using the Optimized Semi-Finished Lens Blank A. Obviously, employing the combination of the Optimized Semi-Finished Lens Blank A and Optimized Semi-Finished Lens Blank B requires even less material to be removed. However, a surfacing lab that is transitioning from conventional semi-finished lens blanks to the inventive optimized semi-finished lens blanks may be compelled to first use only Lens Blank B as needed, so that they can continue using their remaining conventional semi-finished lens blanks in inventory. Also, from the manufacturer's standpoint, since developing two different optimized semi-finished lens blanks implies double the effort/investment, labs might pursue the development of only one optimized semi-finished lens blank.

To achieve even greater improvements from the present invention, in certain embodiments, a free-form design of the front surface of the semi-finished lens blank may also be implemented. By employing a free-form front surface on the semi-finished lens blank, the finishing tool path changes resulting in reduced rates of departure. This, in turn, reduces cycle time while improving surface finish prior to polishing.

Figure 8:
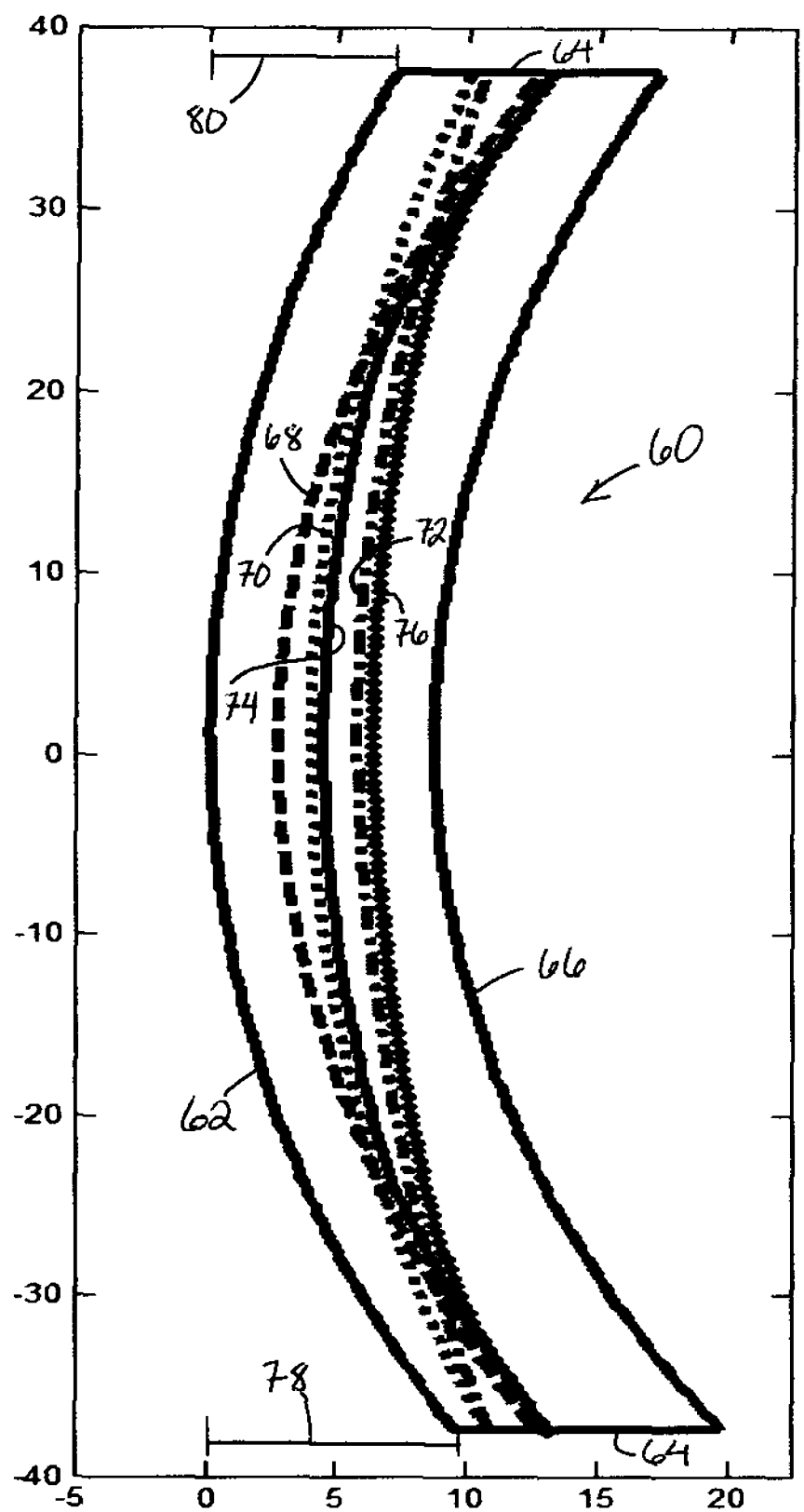
FIG. 8 is a side cross-sectional view of a lens shown with exemplary back optical surfaces of finished ophthalmic lenses, a back optical surface of a conventional semi-finished lens, and various back optical surfaces of semi-finished lenses according to embodiments of the present invention.

FIG. 8 shows a cross-sectional view of a semi-finished lens blank 60 similar to that shown in FIG. 4 except that the semi-finished lens blank 60 shown in FIG. 8 has a progression on a front surface 62. Alternatively stated, the front surface 62 of the semi-finished lens 60 employs a progressive surface type or design that varies gradually in optical power from distant to near zones.

For the sake of comparison and clarity, the semi-finished lens 60 is shown employing an edge 64 and is shown with various different back optical surfaces. Back optical surface 66 is representative of a back optical surface of a standard or conventional semi-finished lens blank. Back optical surface 68 is representative of a back optical surface of a first example of a finished lens. Back optical surface 70 is representative of a back optical surface of a second example of a finished lens. Back optical surface 72 is representative of a back optical surface of a third example of a finished lens. Back optical surface 74 is representative of an example of an inventive back optical surface according to one embodiment of the present invention, and back optical surface 76 is representative of an inventive back optical surface of an example of an inventive back optical surface according to another embodiment of the present invention.

Due to the progression on the front surface 62 of the semi-finished lens blank 60, the front surface 62 of the semi-finished lens blank 60 shown in FIG. 8 has a steeper curve at the bottom of the front optical surface 62 which yields a bottom sag height 78 of about 10 mm compared to a top sag height 80 of the front optical surface 62 of about 7 mm. This progression, in turn, allows the inventive back optical surfaces to be flatter or less curved. For example, both the top and bottom of front surface 62 of the semi-finished lens blank 60 having the inventive back optical surface 74 have a sag height of about 12.5 mm. This is beneficial in reducing the rate of departure during diamond turning and proves to be significant in reducing the time of the overall direct surface processing.

Edge Optimization

In certain embodiments of the present invention, an optimized edge shape or design is also provided for semi-finished lens blanks by following a design procedure substantially analogous to that described for the optimized front and/or back optical surface of the inventive semi-finished lens blanks since current lens management systems also provide the geometry of the frame contour.

Figure 9A:
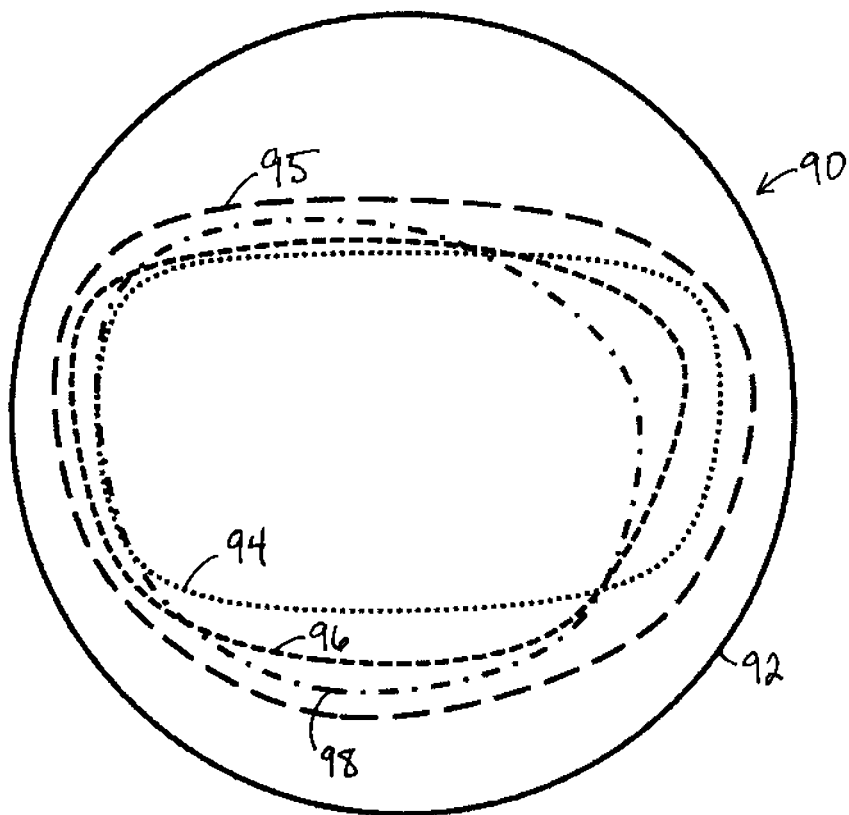
FIG. 9A is a plan view of a lens shown with exemplary edge shapes of finished ophthalmic lenses, an edge shape of a conventional semi-finished lens blank, and an optimized edge shape of a semi-finished lens according to one embodiment of the present invention.

FIG. 9A shows a plan view of an optimized edge shape for an inventive semi-finished lens blank according to the present invention that is analogous to the optimized optical surface designs shown in FIGS. 3, 4, and 8.

For the sake of comparison and clarity, the semi-finished lens 90 is shown with various different lens edge shapes. A lens edge shape 92 is representative of a lens edge shape of a standard or conventional semi-finished lens blank. As previously described, conventional semi-finished lens blanks employ a circular lens edge shape 92. A lens edge shape 94 is representative of a lens edge shape of a first example of a finished, edged lens. A lens edge shape 96 is representative of a lens edge shape of a second example of a finished edged lens. A lens edge shape 98 is representative of a lens edge shape of a third example of a finished edged lens. A lens edge shape 95 is representative of an example of an optimized lens edge shape according to one embodiment of the present invention.

Figure 9B:
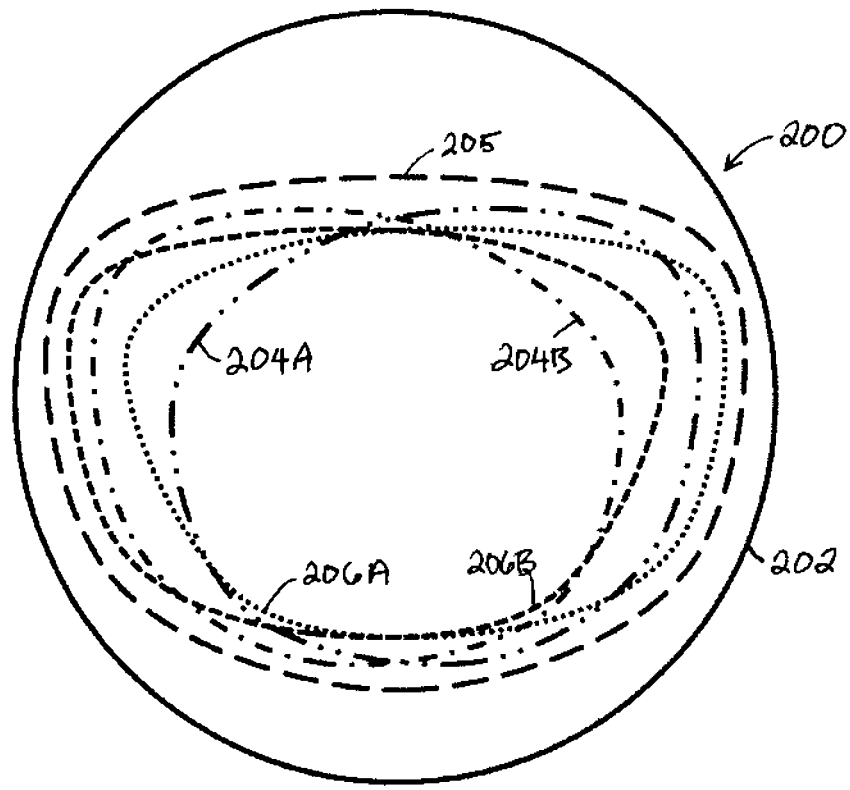
FIG. 9B is a plan view of a lens shown with exemplary edge shapes of finished ophthalmic lenses, an edge shape of a conventional semi-finished lens blank, and an optimized edge shape of a semi-finished lens according to one embodiment of the present invention.

In certain embodiments, as shown in FIG. 9B, a single semi-finished lens blank is used for formation of both a left and a right eye finished edged lens. In such embodiments an optimized edge shape of the inventive semi-finished lens blank would be symmetrical.

For the sake of comparison and clarity, as shown in FIG. 9B, a semi-finished lens 200 is shown with various different lens edge shapes. A lens edge shape 202 is representative of a lens edge shape of a standard or conventional semi-finished lens blank. As previously described, conventional semi-finished lens blanks employ a circular lens edge shape 202. A lens edge shape 204A is representative of a right eye lens edge shape of a first example of a finished, edged lens, and lens shape 204B is representative of a corresponding left eye lens edge shape of the first example of a finished, edged lens. A lens edge shape 206A is representative of a right eye lens edge shape of a second example of a finished, edged lens, and lens shape 206B is representative of a corresponding left eye lens edge shape of the second example of a finished, edged lens. A lens edge shape 205 is representative of an optimized lens edge shape according to one embodiment of the present invention.

With reference to FIG. 10, a method 100 of forming a semi-finished lens blank according to the present invention includes obtaining a first lens mold having a first curved surface for forming a first optical surface (102). Obtaining a second lens mold having a second curved surface for forming a second optical surface (104), the second curved surface approximating second optical surfaces of a plurality of finished ophthalmic lenses at coordinates at which lenses of the plurality of finished ophthalmic lenses have maximum thicknesses. The designs and design considerations for the first and second curved surface for formation of the first and second optical surfaces, respectively, of the inventive semi-finished lens blank are as described above.

The method 100 further includes introducing a bulk lens material between the first curved surface of the first lens mold and the second curved surface of the second lens mold (106); solidifying the bulk lens material (108); and removing a formed semi-finished ophthalmic lens from between the first and second lens molds (110).

The design methods and the semi-finished lens blanks according to the present invention may employ only one of the above-described optimized front optical surface, optimized back optical surface, and optimized edge shapes, or the semi-finished lens blanks according to the present invention may employ a combination of any of these optimized optical surface and edge shape designs.

The above described design methods and the above described inventive semi-finished lens blanks according to the present invention may be employed to form semi-finished lens blanks formed through an injection molding process or through a lens casting process. The Assignees' U.S. Pat. No. 6,328,446 and U.S. Publication No. 2017/0165878, which are herein incorporated in their entireties by reference, describe examples of such injection molding process and lens casting process.

Semi-finished lens blanks according to the present invention are formed of any organic or inorganic bulk lens material such as glass or plastic. In certain embodiments, the inventive semi-finished lens blanks are formed of a polycarbonate, a liquid monomer mixture, and/or a urethane based prepolymer composition (e.g. Trivex, PPG).

In certain embodiments, semi-finished lens blanks according to the present invention may be optically clear, statically tinted, and/or actively tinted such as through photochromism or electrochromism. The lens blanks may further employ optically functional characteristics or properties including light or other radiation filtering or attenuation, light polarization, hardness, chemical resistance, reflectance, easy-cleaning, hydrophobicity, hydrophilicity, and abrasion resistance. Such characteristics may be incorporated in the inventive semi-finished lens blank by way of coatings; through incorporation of a thin film or thin film laminate within the body of the semi-finished lens blank, through incorporation of a thin film or thin film laminate on to an optical surface; or through incorporation of a functional component, e.g. a colorant, into the bulk lens material from which the inventive semi-finished lens blank is formed.

For example, with regard to the above-described method 100, introducing a bulk lens material between the first curved surface of the first lens mold and the second curved surface of the second lens mold (106) may include introducing the bulk lens resin over a front, over a back, or over a front and back surface of a functional thin film or functional thin film laminate.

The present invention advantageously provides increased throughput of the existing direct surfacing machinery for forming finished optical lenses and further reduces the whole lens industry footprint through (1) reducing waste formed when surfacing semi-finished lens blanks; (2) reducing bulk lens material used in fabricating semi-finished lens blanks; and (3) reducing the energy needed for distribution of semi-finished lens blanks.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. A semi-finished ophthalmic lens comprising:
   a front optical surface having a molded first free form curve;
   a back optical surface having a second curve, said second curve being selected based on a plurality of possible finished lens prescriptions for said semi-finished ophthalmic lens; and
   wherein said second curve approximates a maximum distance from said front optical surface to said back optical surface for said plurality of possible finished lens prescriptions.

2. The semi-finished ophthalmic lens of claim 1 further comprising a polycarbonate.

3. The semi-finished ophthalmic lens of claim 1 further comprising a thiourethane.

4. The semi-finished ophthalmic lens of claim 1 wherein the maximum distance is at an edge of the lens to be produced.

5. The semi-finished ophthalmic lens of claim 1 wherein the maximum distance is near a center of the lens to be produced.

6. The semi-finished ophthalmic lens of claim 1 further comprising an edge shape that approximates maximum dimensions of an edge shape of said lens to be produced.

7. A semi-finished ophthalmic lens comprising:
   a molded front optical surface having a first free form curve;
   a back optical surface having a second curve; and
   a molded edge shape that is selected based on a plurality of possible finished lens edge shapes for said semi-finished ophthalmic lens, wherein said molded edge shape approximates said plurality of possible finished lens edge shapes.

8. The semi-finished ophthalmic lens of claim 7 wherein the front optical surface comprises a front surface of the semi-finished ophthalmic lens.

9. The semi-finished ophthalmic lens of claim 7 wherein the edge shape is oblong.

10. The semi-finished ophthalmic lens of claim 7 wherein the edge shape is non-symmetric.

11. The semi-finished ophthalmic lens of claim 7 wherein the second curve is approximately representative of a maximum distance from said front optical surface to said back optical surface for said plurality of possible finished lens prescriptions.

12. A method for forming a semi-finished ophthalmic lens comprising:
    providing a mold;
    said mold having a first free form surface for forming a front surface of said semi-finished ophthalmic lens;
    said mold having a second curved surface for forming a back surface of said semi-finished lens, said second curve being selected based on a plurality of possible finished lens prescriptions for said semi-finished lens;
    said second curved surface approximates a maximum distance from said front optical surface to said back optical surface for said plurality of possible finished lens prescriptions;
    introducing a fluid bulk lens material into said mold;
    solidifying the fluid bulk lens material; and
    removing a formed semi-finished ophthalmic lens from said mold.

13. The method of claim 12 wherein said mold defines an edge shape of said semi-finished ophthalmic lens that is representative of an edge shape of a lens to be produced.

14. The method of claim 12 wherein said maximum distance is near a center of the finished lens intended to be produced.

15. The method of claim 12 wherein introducing the fluid bulk lens material comprises introducing a polycarbonate.

* * * * *